(12) United States Patent
Taki et al.

(10) Patent No.: US 8,055,488 B2
(45) Date of Patent: Nov. 8, 2011

(54) SUPPORT PROGRAM AND DESIGN SUPPORT METHOD

(75) Inventors: Kenji Taki, Kawasaki (JP); Masaru Kageura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 741 days.

(21) Appl. No.: 12/145,736

(22) Filed: Jun. 25, 2008

(65) Prior Publication Data
US 2009/0006041 A1    Jan. 1, 2009

(30) Foreign Application Priority Data

Jun. 28, 2007 (JP) ................. 2007-171044

(51) Int. Cl.
*G06G 7/48* (2006.01)
*B65H 5/22* (2006.01)

(52) U.S. Cl. ............... 703/6; 271/3.06; 271/3.09

(58) Field of Classification Search .......... 703/6, 7, 703/13; 271/3.01, 3.06, 3.09, 3.2, 4.06, 4.09, 271/8.1, 9.02; 399/31, 68, 124, 162, 176, 399/312, 388

See application file for complete search history.

(56) References Cited

U.S. PATENT DOCUMENTS

| | | | | |
|---|---|---|---|---|
| 5,999,757 | A | * | 12/1999 | Shimomura et al. ........... 399/9 |
| 2004/0158341 | A1 | * | 8/2004 | Kano et al. .................... 700/97 |
| 2007/0088533 | A1 | * | 4/2007 | Serizawa ....................... 703/6 |

FOREIGN PATENT DOCUMENTS

| JP | 11-116133 A | 4/1999 |
|---|---|---|
| JP | 11-195052 A | 7/1999 |
| JP | 2003-337836 A | 11/2003 |
| JP | 2004-258774 A | 9/2004 |

* cited by examiner

*Primary Examiner* — Paul Rodriguez
*Assistant Examiner* — Andre Pierre Louis
(74) *Attorney, Agent, or Firm* — Canon USA Inc. IP Division

(57) ABSTRACT

A design support method comprising reading a two-dimensional cross-sectional model created by a computer-aided design system, saving information on a locus of travel of the recording medium, recognizing parts in a vicinity of the locus of the recording medium, and creating a simulation model in which parts other than the parts recognized in the recognizing are excluded from objects subject to contact calculation.

8 Claims, 14 Drawing Sheets

SUPPORT PROGRAM AND DESIGN SUPPORT METHOD

BACKGROUND OF THE INVENTION

1. Field of the Invention

The present invention relates to design support methods and programs and, in particular, to a design support program and a design support method which can be advantageously used for achieving optimal design of a conveying path for a sheet-like material.

2. Description of the Related Art

In designing a conveying path, it is desirable that the function of a designed object is examined under various conditions before the actual fabrication of a product. Such examination can reduce the number of processes required to manufacture and test a prototype, and can reduce the development period and cost. As a technique for simulating the behavior of a sheet in a conveying path, a finite element method for a recording medium is used.

Specifically, Japanese Patent Laid-Open No. H11-195052 and Japanese Patent Laid-Open No. H11-116133 disclose design support programs. In these programs, a conveying resistance and a contact angle between a recording medium and guides or rollers for the recording medium are evaluated by expressing the recording medium as finite elements. Then, contact conditions between the recording medium and the guides or rollers in the conveying path are determined by numerically solving a motion equation.

The motion of a recording medium is solved by formulating a motion equation of the recording medium discretely represented by finite elements or mass-spring systems. Then, an analysis target time period is divided into time steps each having a finite length, and the motion of the recording medium is solved by numerical time integration that sequentially calculates unknown accelerations, velocities, and displacements in the respective time steps starting from time 0. This technique is well known as Newmark $\beta$ method, Wilson $\theta$ method, Euler's method, Kutta-merson method, and the like (see, for example, Katsuhito Sudoh, "Modeling a String from Observing the Real Object" Proc. of Int. Conf. on Virtual Systems and Multimedia (VSMM2000), pp. 544-553, (2000)).

For example, Japanese Patent Laid-Open No. 2004-258774 discloses a technique for performing such a simulation. In this technique, a conveying path is rendered on a two-dimensional plane by line segments including a strait line, an arc, and a spline curve so that the conveying path is designed.

In another technique, shape data created by a CAD (computer-aided design) system is converted into simulation data. In this case, application software which performs preprocessing for creating a simulation model is generally used. Such application software allows a user to create a contact definition and a simulation condition definition including input of physical property values.

Further, with a view to reducing the processing load for a simulation, for example, Japanese Patent Laid-Open No. 2000-331194 discloses a model creating technique in which holes or fillets unnecessary for simulation are omitted.

In such design support programs described above, a recording medium is divided into a finite number of elements or masses, and a reacting force between the recording medium and conveying guides is generated by performing contact calculation between one element or one mass and one line segment constituting the conveying path. Thus, the program reproduces complicated behaviors of the recording medium in the conveying path.

The contact calculation is performed for each time step of numerical time integration. Thus, the calculation load for the numerical time integration disadvantageously increases with increasing number of elements or mass points of a recording medium and increasing number of line segments forming a conveying path, resulting in prolonged calculation time.

When a two-dimensional model having a principal cross-section projected from a three-dimensional CAD drawing is created, the model includes a number of unnecessary parts that are irrelevant to sheet conveyance. In such a case, the number of line segments exceeds five thousand in the case of a typical copying machine. Such a model requires ten hours or more for behavior calculation and is not able to meet users' needs as a design support tool. Therefore, it is desirable to omit parts which do not come into contact with a recording medium from the calculation model.

However, in order to create a model for a recording medium conveying simulation on the basis of a design drawing based on a three-dimensional CAD, it is necessary for a user to manually determine contact parts between a recording medium and a conveying path and erase parts other than the contact parts. This operation takes the user considerable labor especially when a drawing to be processed is large, and lacks accuracy. To address this, Japanese Patent Laid-Open No. 2003-337836, for example, discloses a method in which a FEM (finite element method) model based on a shape characteristic is automatically created by a device on the basis of creation processes stored in a database.

SUMMARY OF THE INVENTION

The present invention has been made in view of the above circumstances. Accordingly, there is a need for a design support program and a design support method for efficiently creating a calculation model for a recording medium conveying simulation.

Some embodiments of the present invention provide a method comprising: reading a two-dimensional cross-sectional model created by a computer-aided design system; saving information on a locus of travel of the recording medium; recognizing parts in a vicinity of the locus of the recording medium; and creating a simulation model in which parts other than the parts recognized in the recognizing are excluded from objects subject to contact calculation.

According to an aspect of the present invention, a design support program for supporting design of a conveying path by simulating a behavior of a sheet-like recording medium being conveyed in the conveying path causes a computer to execute the steps of reading a two-dimensional cross-sectional model created by a computer-aided design system, saving information on a locus of travel of the recording medium, recognizing parts in the vicinity of the locus of the recording medium, and creating a simulation model in which parts other than the parts recognized in the recognizing are excluded from objects subject to contact calculation.

According to an exemplary embodiment of the present invention, only parts that are necessary for a recording medium conveying simulation are extracted from a CAD drawing. Such extraction is typically carried out by a user according to the related art. Thus, operations for reducing the scale of a model and calculation load can be automated. In a typical copying machine, in general, more than five thousand line segments are included in a corresponding two-dimensional design drawing. By automatically extracting one hundred line segments necessary for recording medium conveyance, the calculation speed can be increased by ten to fifty times.

According to an exemplary embodiment of the present invention, information on a locus of a recording medium can be automatically generated, which is the first step of creation of a model for a recording medium conveying simulation. When it is not possible to generate an accurate locus of the recording medium using only passing points based on pairs of rollers, the user can flexibly change the shape of the locus.

In addition, according to an exemplary embodiment of the present invention, parts in the vicinity of locations at which a recording medium is likely to pass can be automatically extracted for a recording medium conveying simulation.

Further, according to an exemplary embodiment of the present invention, it is also possible to extract parts in the vicinity of the locus of a recording medium without wasting processing load, even when the width of the conveying path is not constant and the conveying path has various shapes including a discontinuous shape.

Moreover, according to an exemplary embodiment of the present invention, a user is allowed to check parts extracted in a process of recognizing the locus of a recording medium. When a failure of extraction is found, the process is repeated so that extraction is performed again, and thus a desired conveying path model can be achieved.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Exemplary embodiments of the present invention will now be described in detail in accordance with the accompanying drawings.

Figure 1:
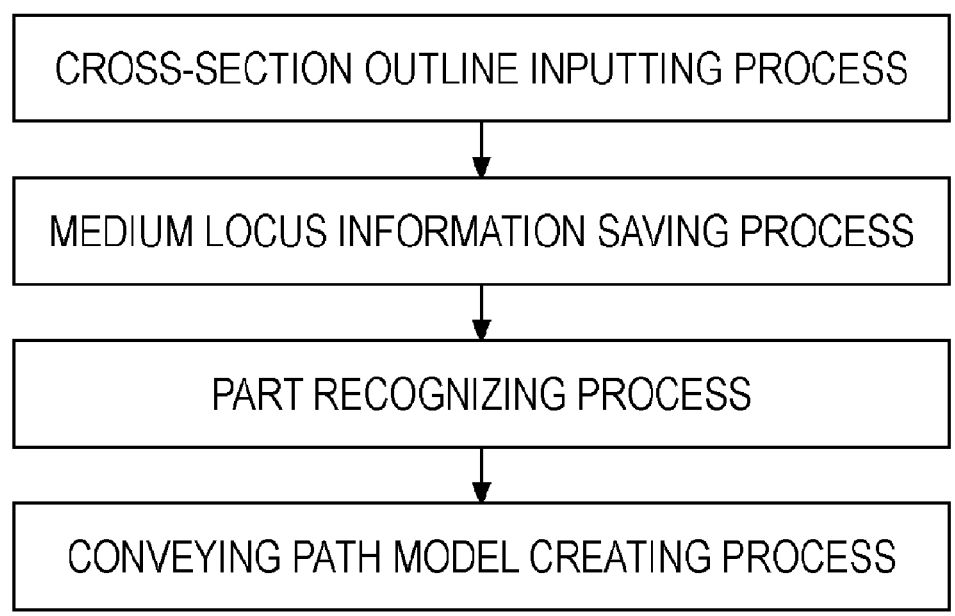
FIG. 1 is a flowchart illustrating a simulation model creation program according to an exemplary embodiment of the present invention.

FIG. 1 illustrates a CAD (computer-aided design) program according to an exemplary embodiment of the present invention. This CAD program causes a computer to execute a cross-section outline inputting process (or step) for reading a two-dimensional cross-sectional model and a conveying path model creating process for newly creating a simulation model in which parts other than recognized parts are excluded from objects to be subject to contact calculation.

Now, a hardware configuration for executing a design support program according to an exemplary embodiment of the present invention will be described.

Figure 16:
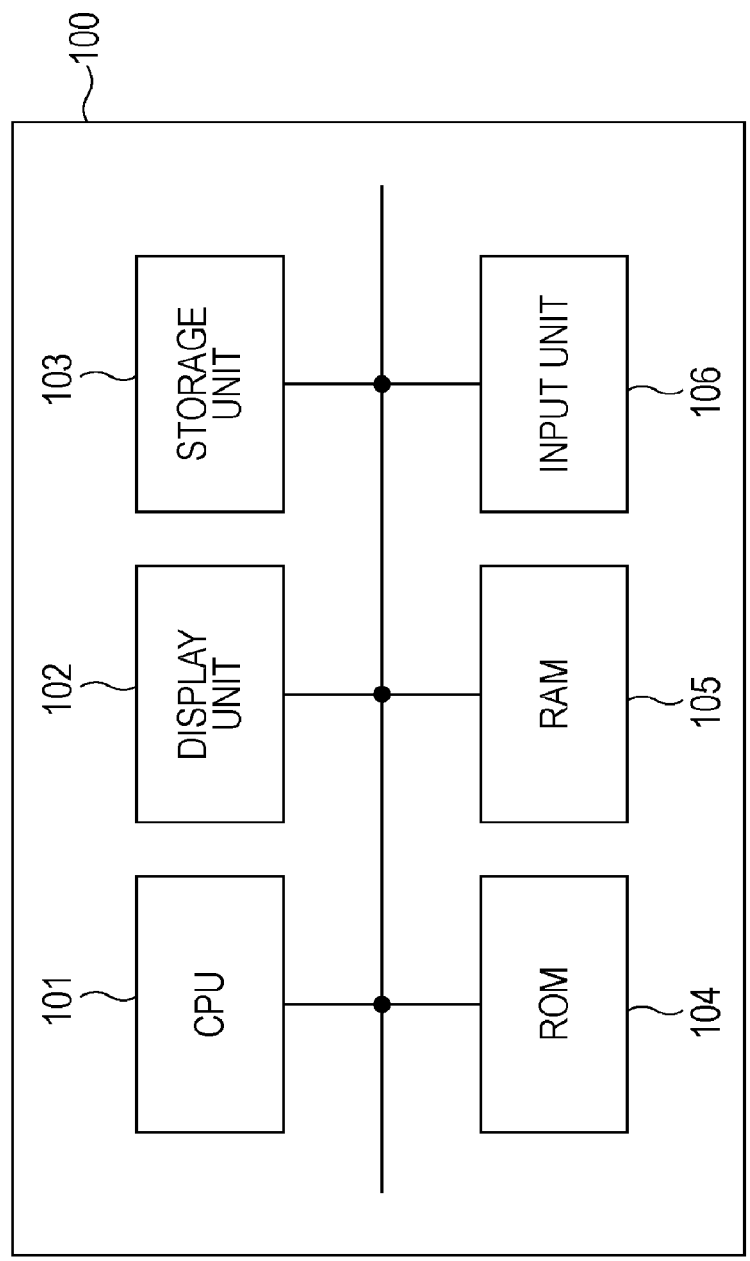
FIG. 16 illustrates a hardware configuration for executing a design support program according to an exemplary embodiment of the present invention.

FIG. 16 is a block diagram schematically illustrating an example of a hardware configuration of an information processing apparatus (design support apparatus) 100 to which the design support program according to an exemplary embodiment of the present invention can be applied.

This information processing apparatus 100 includes a CPU 101, a display unit 102, and a storage unit 103, a ROM (read-only memory) 104, a RAM (random access memory) 105, and an input unit 106. The CPU 101 is a central processing unit for controlling the entire apparatus. The display unit 102 displays various input conditions and analysis results according to this exemplary embodiment. The storage unit 103 may be a hard disk for storing the analysis results and the like according to this exemplary embodiment. The ROM 104 stores a control program of this exemplary embodiment, various application programs, data, etc. The RAM 105 serves as a work area used when the CPU 101 executes processing while controlling various components on the basis of the control program. The input unit 106 includes a keyboard, a mouse, etc.

Input of a cross-section outline is performed first. In this process, external data in which a mechanism of travel of a recording medium is projected as a two-dimensional cross-sectional model is retrieved and rendered on a plane. The cross-section outline retrieved through this process is formed by a combination of a plurality of line segments, including line segments that are not necessary for simulating a conveying behavior. Accordingly, processes according to an exemplary embodiment of the present invention are performed.

In a procedure of processes according to an exemplary embodiment of the present invention, a medium locus information saving process is performed first. In this process, information on the locus of travel of a recording medium is defined on the plane on which the cross-section outline is rendered, and then the locus information is saved. Then, a part recognition process is performed. In this process, the saved locus information is used to determine whether each of line segments forming the cross-section outline is in the vicinity of the locus of the recording medium.

Subsequently, a conveying path model creation process is performed. In this process, a line segment that is not in the vicinity of the locus is excluded from objects that are to be subject to contact calculation. As a result, a conveying path model with reduced calculation load is created.

Figure 2:
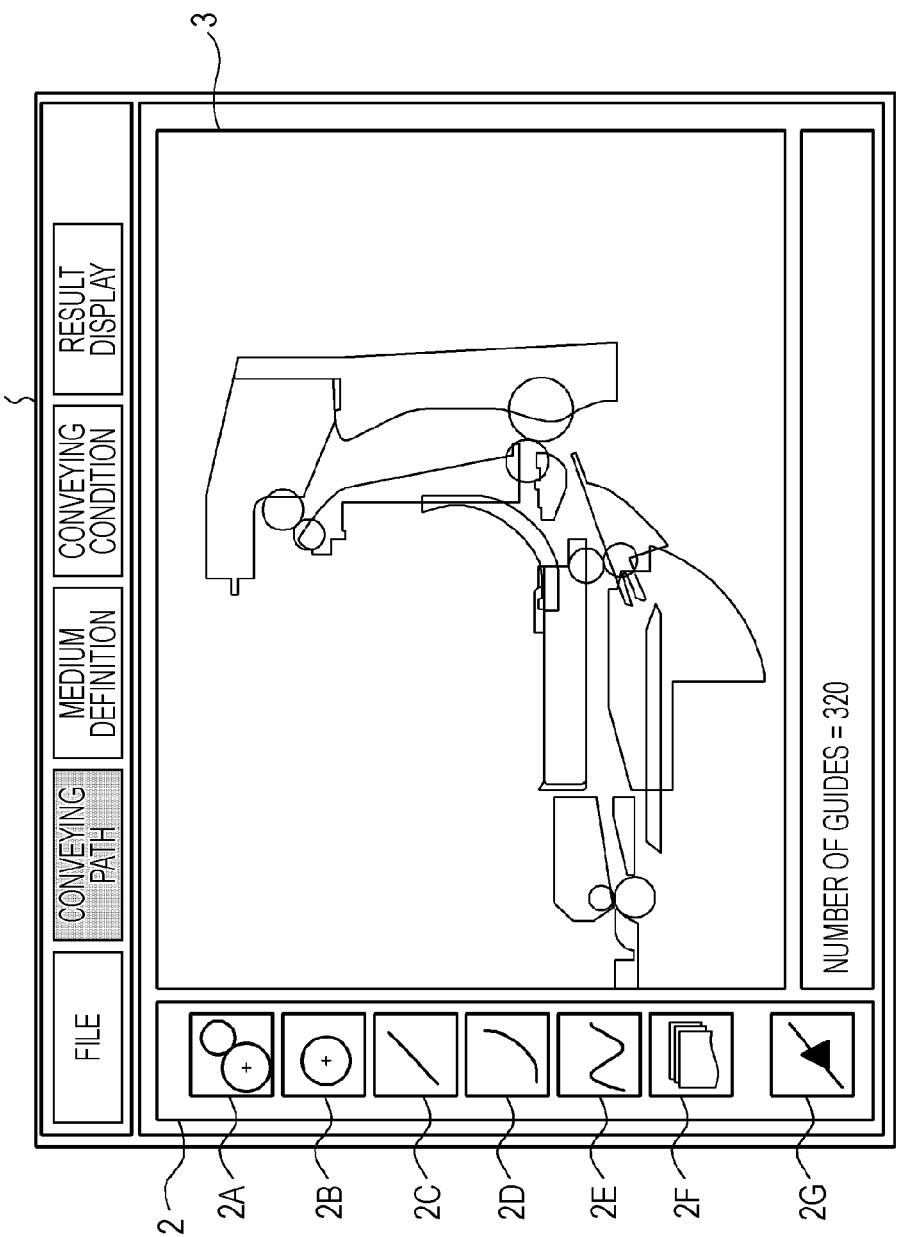
FIG. 2 shows a screen shot illustrating a conveying path defining operation according to an exemplary embodiment of the present invention.

FIG. 2 illustrates an example of a configuration of screen display used in a recording medium conveying simulation. The screen includes a menu bar 1, a sub-configuration menu 2, a graphical window 3 for displaying a defined conveying path and an operation result, and a command field 4 for output of a program message and input of a value as necessary.

In a simulation, a conveying path and a recording medium are defined, and motion calculation is performed using the recording medium and the conveying path being in contact with each other. Procedures of basic processes of creation of a conveying path and a recording medium, motion calculation, and contact calculation will be described below.

When a "conveying path" button in the menu bar 1 is pressed, the sub-configuration menu 2 having a predetermined display range is displayed in the left side of the screen, as illustrated in FIG. 2. A conveying path is defined by a combination of a strait line, a curve, and a spline curve and is prepared by individually creating these line segments or converting a CAD drawing into a predetermined format. The sub-configuration menu 2 includes part definition buttons 2A to 2E for individually creating parts and a button 2F for retrieving external data.

When the button 2F is pressed, a dialogue box for retrieving external data is displayed, which allows a user to select a predetermined input file. The graphic window 3 displays a cross-section outline retrieved by this operation.

Figure 3:
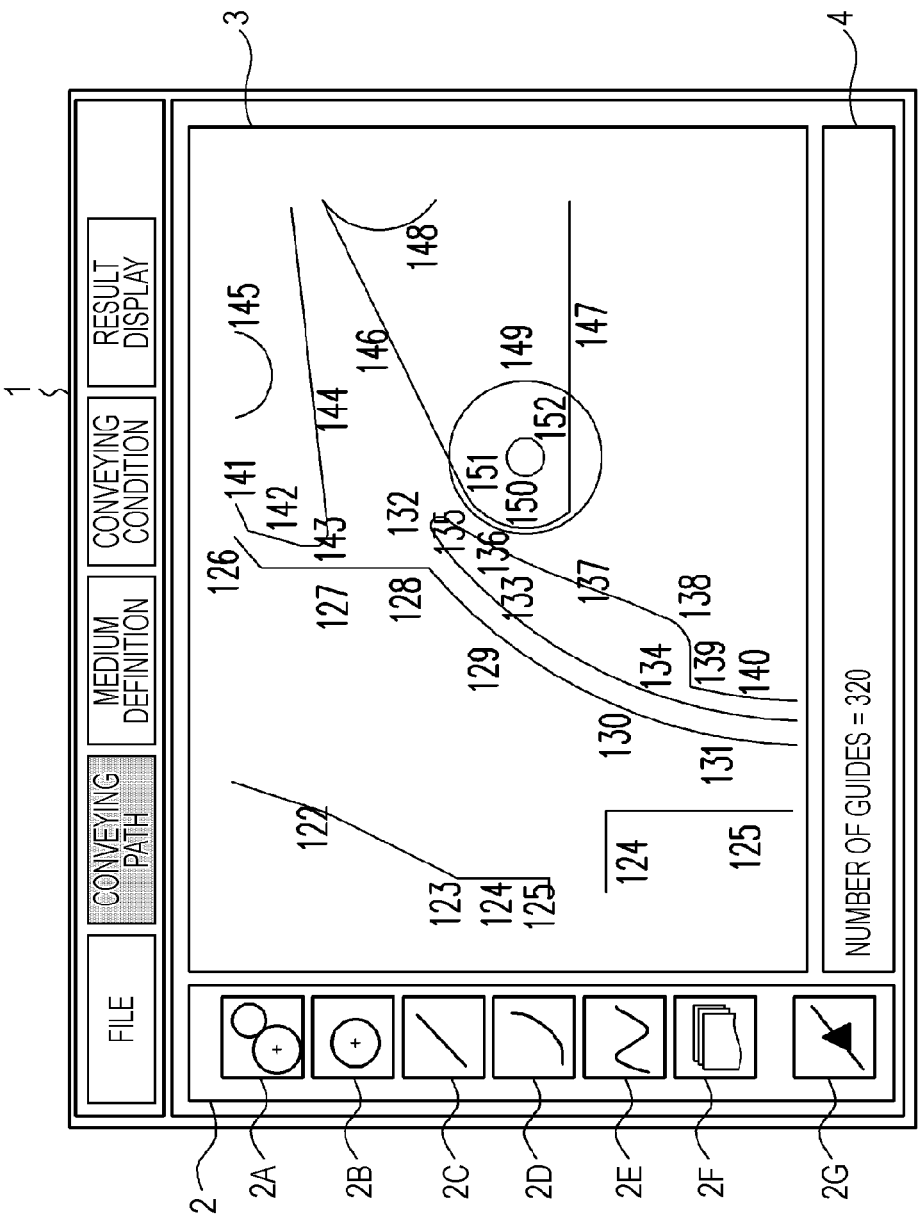
FIG. 3 is an enlarged view of a conveying path according to an exemplary embodiment of the present invention.

FIG. 3 illustrates a screen in which IDs of line segments are displayed in an enlarged view of a conveying path. The conveying path has a complicated shape, including combinations of strait lines and curves. The command field 4 displays the number of currently defined segments. In this example, the conveying path is rendered by 320 line segments (see FIG. 2).

Figure 4:
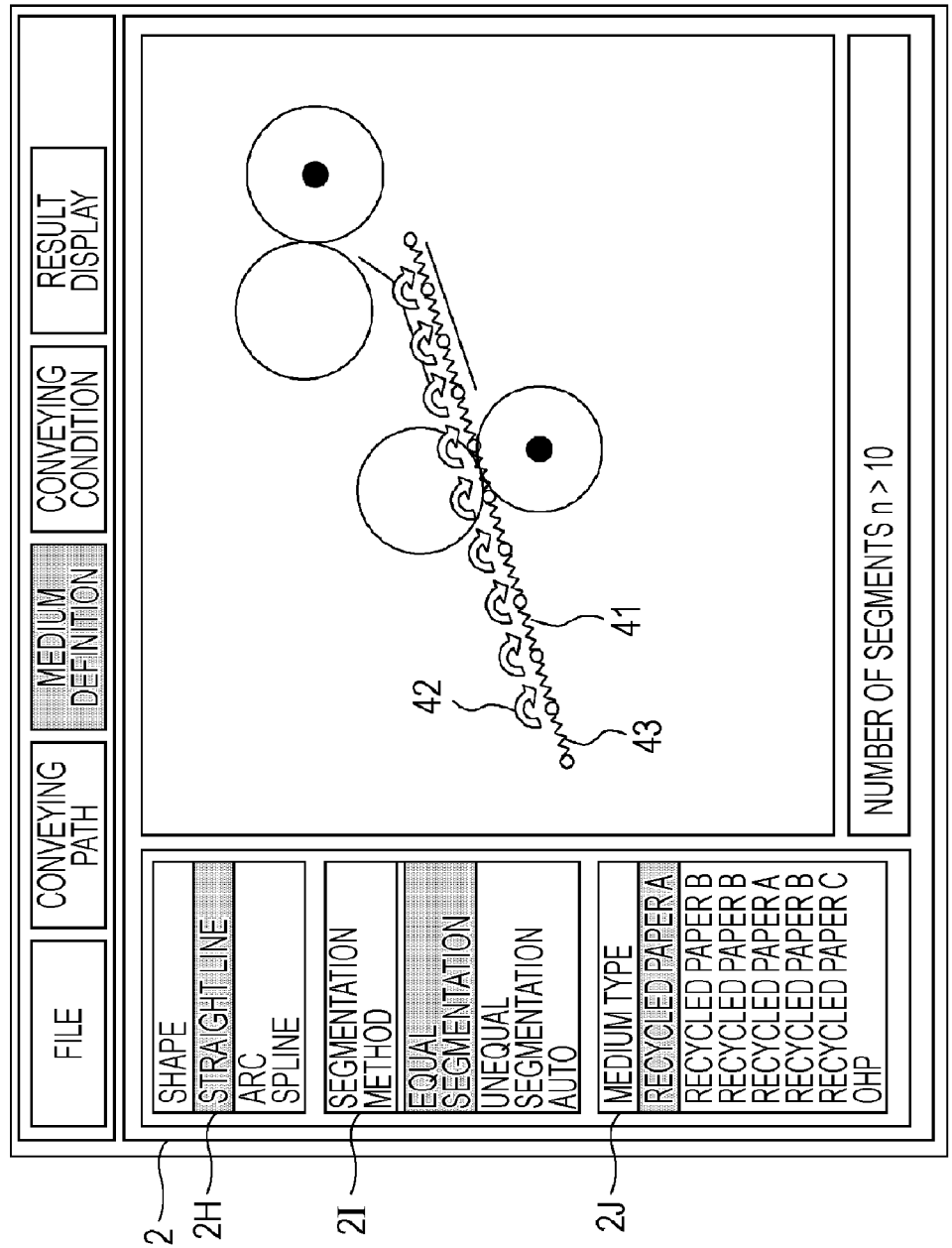
FIG. 4 shows a screen shot illustrating a recording medium defining operation according to an exemplary embodiment of the present invention.

When a "recording medium" button is pressed, a recording medium is defined similarly to the conveying path. When a recording medium is positioned, the recording medium is discretized into spring-mass systems. As illustrated in FIG. 4, "straight line" in a shape selection field 2H is selected so that the recording medium is defined. FIG. 4 also illustrates a case where "equal segmentation" in a segmentation method selection field 2I is selected, and the number of segments is set to 10. In this case, the physical values such as the Young's modulus, thickness, and density of the recording medium are read out from a stored database by selecting "medium type" in a medium selection field 2J.

When the recording medium is regarded as an elastic body, a rotational spring 42 connecting mass points 41 represents flexural rigidity of the recording medium and a translational spring 43 represents the tensile rigidity of the recording medium. Spring constants of these springs can be derived from the elastic theory. A rotational spring constant $kr$ and a translational spring constant $ks$ are given by the following equations (1) and (2), using Young's modulus E, width w, thickness t, a distance between mass points $\Delta L$.

$$kr = Ewt3/12\Delta L, \ ks = Ewt/\Delta L \qquad (1)$$

$$\Delta L = \sqrt{((x2-x1)2 + (y2-y1)2)}/n \qquad (2)$$

The mass m of a mass point is calculated from the following equation (3), using the length L, width w, thickness t, density $\rho$, and the number of divided segments n of the recording medium.

$$m = Lwt\rho/(n-1) \qquad (3)$$

Once the recording medium and the line segments forming the conveying path are defined, motion calculation is performed.

Figure 5:
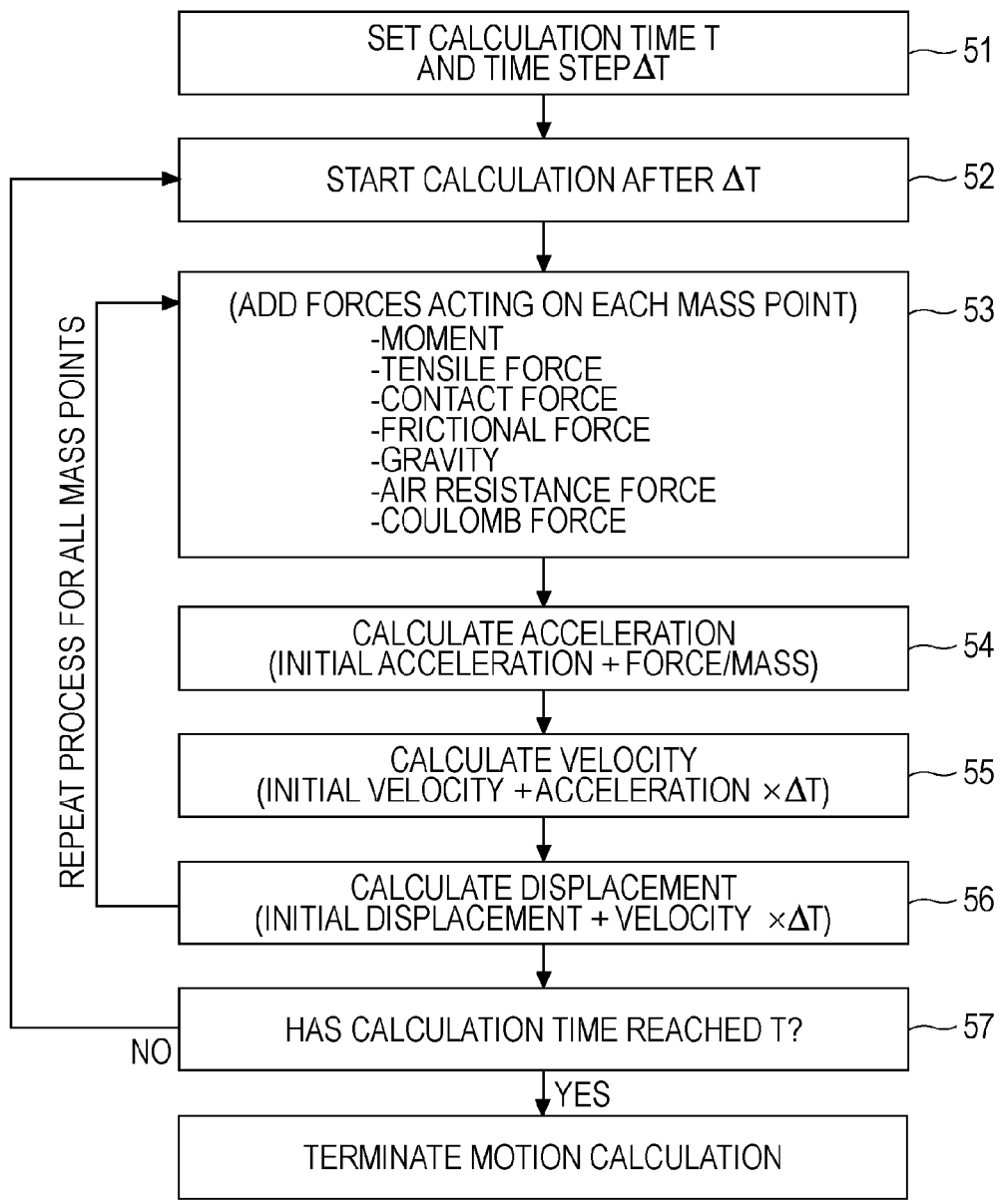
FIG. 5 is a flowchart illustrating motion calculation according to an exemplary embodiment of the present invention.

Numerical time integration and processing of interference are performed in accordance with the following procedures. FIG. 5 is a flowchart illustrating motion calculation. At Step 51, a real time T required for the calculation of the motion of the recording medium and a time step $\Delta t$ of numerical time integration used when a motion equation is numerically solved are set.

Steps 52 to 57 correspond to a loop for numerical time integration. The motion of the recording medium is calculated every $\Delta t$ from the initial time and calculation results are stored in a storage device.

At Step 52, an initial acceleration, an initial velocity, and an initial displacement necessary for performing calculation after $\Delta t$ seconds are set. The calculation results of these values are upon completion of one cycle (i.e., the values obtained in the previous cycle are used as initial values).

At Step 53, forces acting on individual mass points forming the recording medium is defined. The forces include rotation moment, tensile force, contact force, frictional force, gravity, air resistance force, and coulomb force. After these forces acting on the mass points are calculated, the resultant force of them is finally defined as a force acting on the recording medium.

At Step 54, an acceleration after $\Delta t$ sec is calculated by dividing the respective forces acting on the mass points obtained in Step 53 by the respective masses of the mass points and adding the initial acceleration to the quotient.

Likewise, a velocity is calculated in Step 55 and a displacement is calculated in Step 56.

In this exemplary embodiment, the Euler time integration method is used for a series of calculations of physical quantities after $\Delta t$ sec in Steps 53 to 56. However, other time integration techniques, such as the Kutta-merson method, Newmark-$\beta$ method, and Wilson-$\theta$ method may be used. At Step 57, it is determined that the calculation time has reached the real time T set in Step 51. If the calculation time has reached the real time T, the motion calculation is terminated. If not, the procedure returns to Step 52 and the above time integration is repeated.

Now, a procedure of calculating a contact force in Step 53 will be described. To calculate a contact force, it is checked whether interference occurs between a mass point of the recording medium and a part. Therefore, it is necessary to calculate a distance between the pass point and the part during the above procedure of motion calculation.

Figure 6:
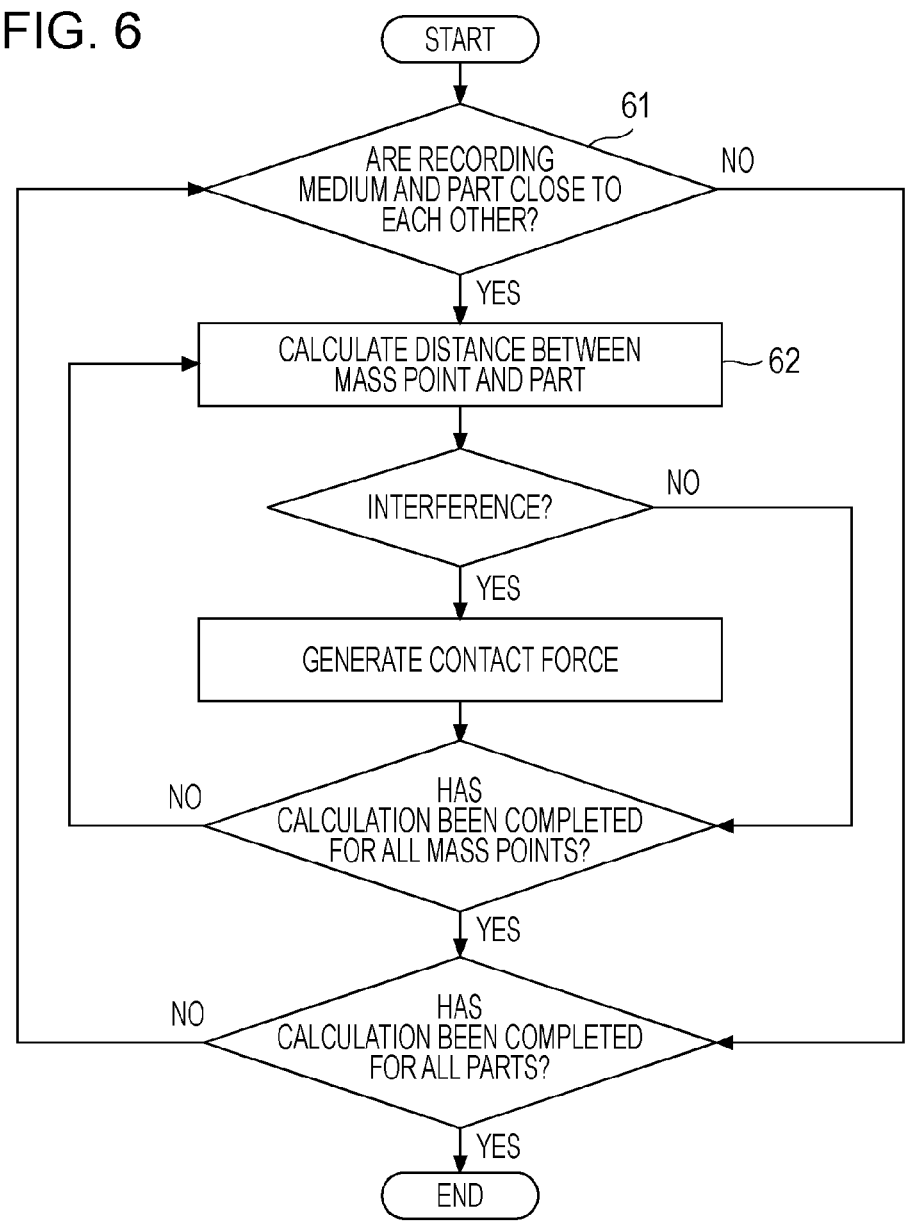
FIG. 6 is a flowchart illustrating an example of contact calculation according to an exemplary embodiment of the present invention.

FIG. 6 is a flowchart illustrating a procedure of contact force calculation. In calculating a distance between the parts and the mass points, processing is repeated for a number of times corresponding to the number of the parts and the number of the mass points. However, repeating the processing many times (i.e., the number of the parts×the number of the mass points) results in significant calculation load. Therefore, the contact force calculation is performed through two-step processing in which the distant calculation is started when a part and the recording medium become closer than a predetermined threshold.

At Step 61, it is determined whether one of the line segments forming the conveying path is in the vicinity of the recording medium.

Figure 7:
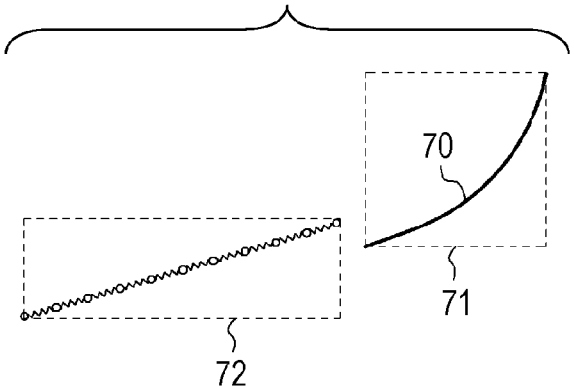
FIG. 7 illustrates a process for checking a distance between a part and a recording medium according to an exemplary embodiment of the present invention.
Figure 8:
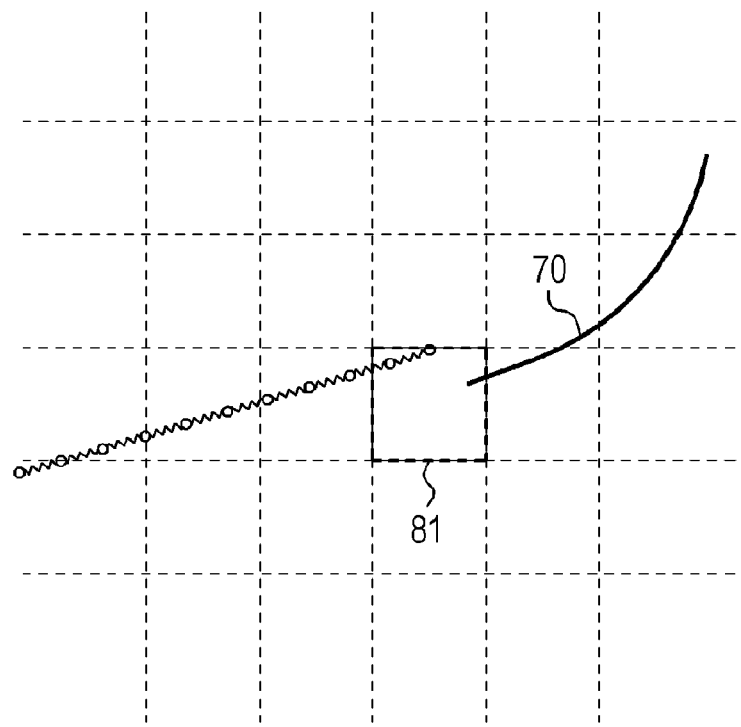
FIG. 8 illustrates a process for checking a distance between a part and a recording medium according to an exemplary embodiment of the present invention.

This distance determination is realized by internal processing in which, as illustrated in FIG. 7, a region 71 containing a part 70 is determined and it is determined whether the region 71 overlaps with a region 72 containing the entire recording medium. For this vicinity determination, various techniques other than this processing are proposed, including a space dividing method in which a space is segmented into blocks and it is determined whether the recording medium and the part are present in the same block (block 81 in FIG. 8).

If it is determined in the vicinity determination of Step 61 that the recording medium and the part are located close to each other, the procedure proceeds to Step 62 and a detailed distance calculation is performed. When the distance between the recording medium and the part decreases to have a negative value, the presence of interference is determined and a contact force is generated.

Figure 9:
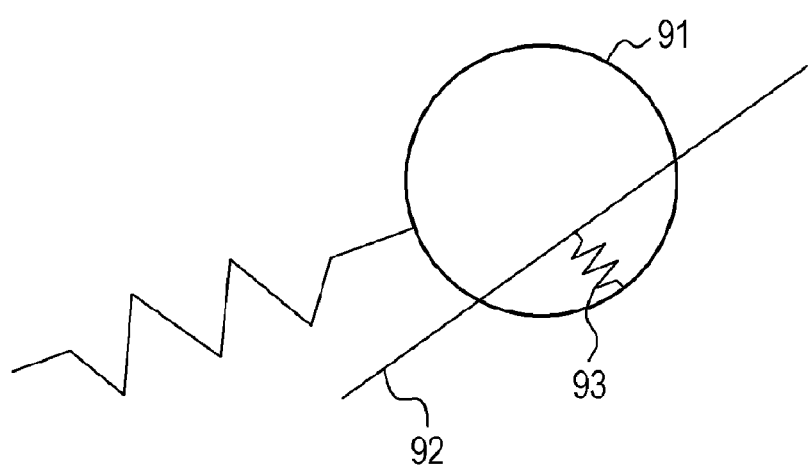
FIG. 9 illustrates calculation of a contact force between a recording medium and a part according to an exemplary embodiment of the present invention.

FIG. 9 illustrates an example of a case where a distance between a part and a mass point is calculated and when interference occurs between the part and the mass point, a force for pushing back the mass point from the part is generated. When interference between a mass point 91 and a part 92 of the conveying path occurs, a spring 93 which represents a force of pushing back the pass point by a force corresponding to the overlapping between the mass point and the part is defined. This calculation is repeated for a number of times corresponding to the number of the mass points.

When the distance calculation for all the mass points for one part is completed, the procedure returns to Step 61, so that the distance calculation is repeated until processing for all the parts is completed.

In order to reduce calculation load for the above motion calculation and contact calculation, the number of parts is reduced as much as possible by omitting parts located far from the recording medium, which are not necessary for distance calculation. In the following, a procedure for reducing such unnecessary parts will be described using the example of FIG. 2, which illustrates a state where a three-dimensional CAD drawing is projected onto a two-dimensional plane so as to be converted into a two-dimensional outline drawing.

First, a media locus information saving process is performed. Upon reading an outline, a computer automatically determines contact points (nips) between conveying rollers, which are passing points of the recording medium for defining the locus of the recording medium. To identify the conveying rollers, a part having a circular characteristic is searched for from the group of the read line segments. When two conveying rollers that are in contact with each other are found, the coordinate information at the contact point between the conveying rollers is obtained and saved as a passing point.

Figure 10:
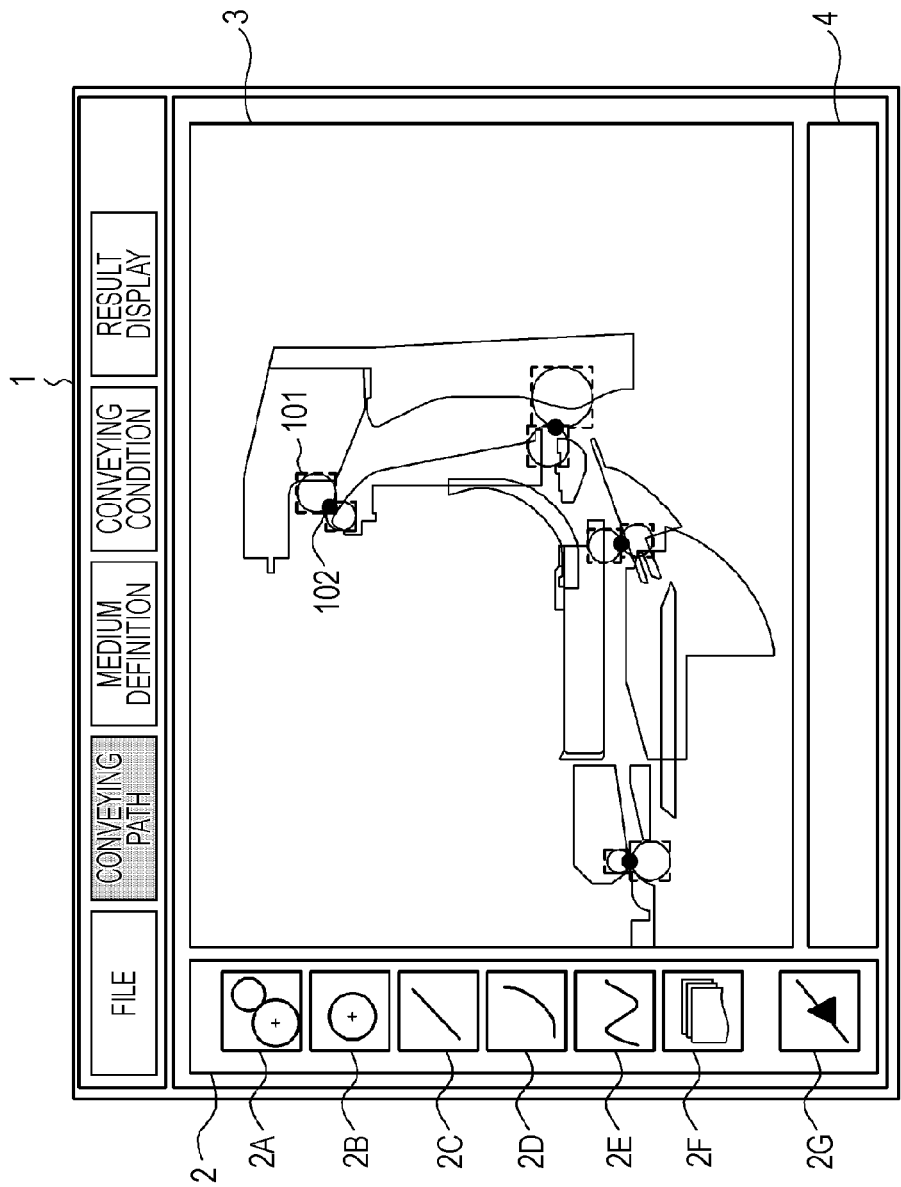
FIG. 10 illustrates a process for acquiring information on a contact coordinate of a contact point between a pair of rollers according to an exemplary embodiment of the present invention.
Figure 11:
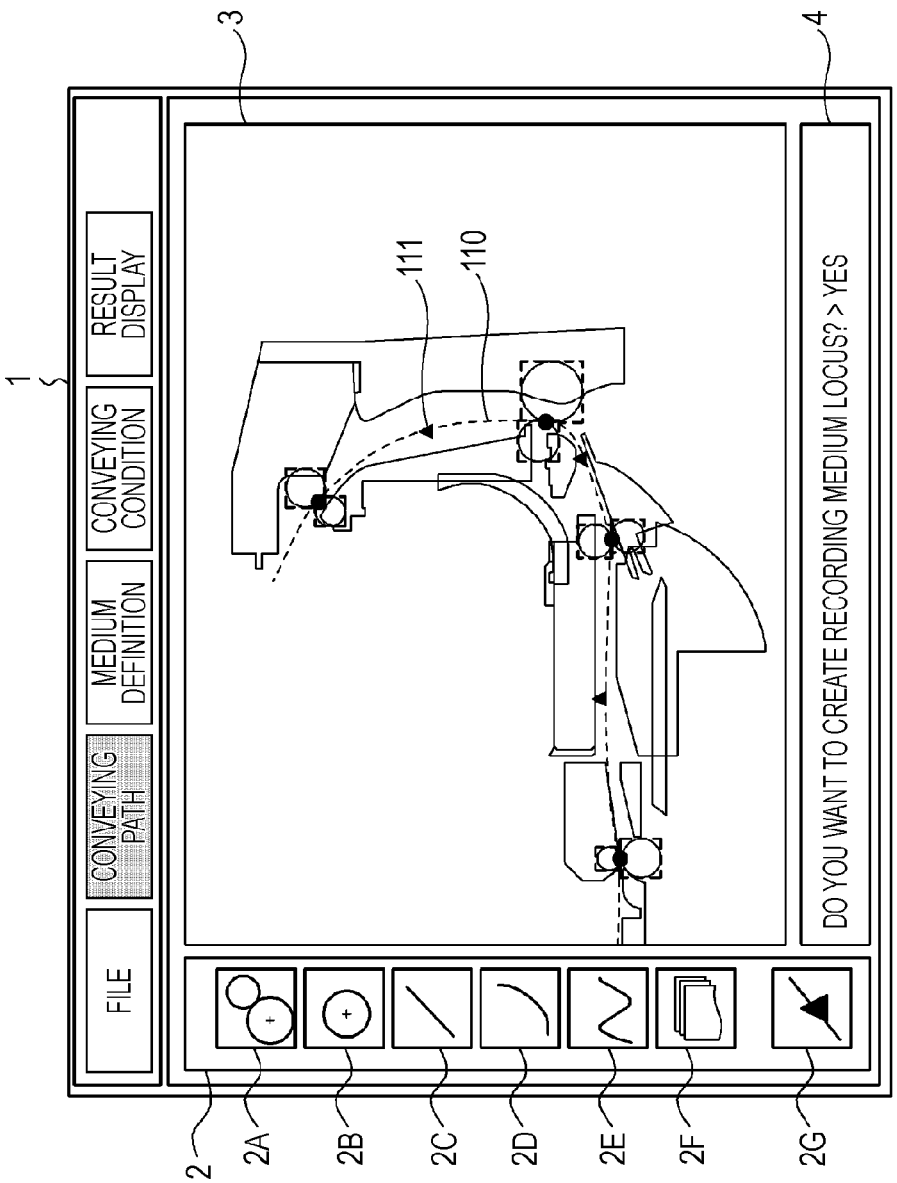
FIG. 11 illustrates a process of creating a locus of a recording medium according to an exemplary embodiment of the present invention.

FIG. 10 illustrates an example of the graphic window 3 in which frames 101 enclosing conveying rollers that have been found are highlighted and coordinates 102 of contact points between pairs of the conveying rollers are marked. In a conveying path illustrated in FIG. 10 the number of the passing points are insufficient for creating an accurate conveying path. Thus, an arbitrary point is defined in addition to the contact points between the pairs of conveying rollers. As illustrated in FIG. 11, pressing of a button 2G allows the user to specify an arbitrary point on the graphic window. Thus, the user presses the button 2G and specifies a point at which the locus of the recording medium passes.

On the graphic window 3, points 111 specified by the user are marked. When the point specifying operation is completed, a message prompting the user to create a locus by connecting the coordinates is displayed.

A curve 110 represents the locus of the recording medium which is defined by connecting the marks defined through the above process.

Figure 12:
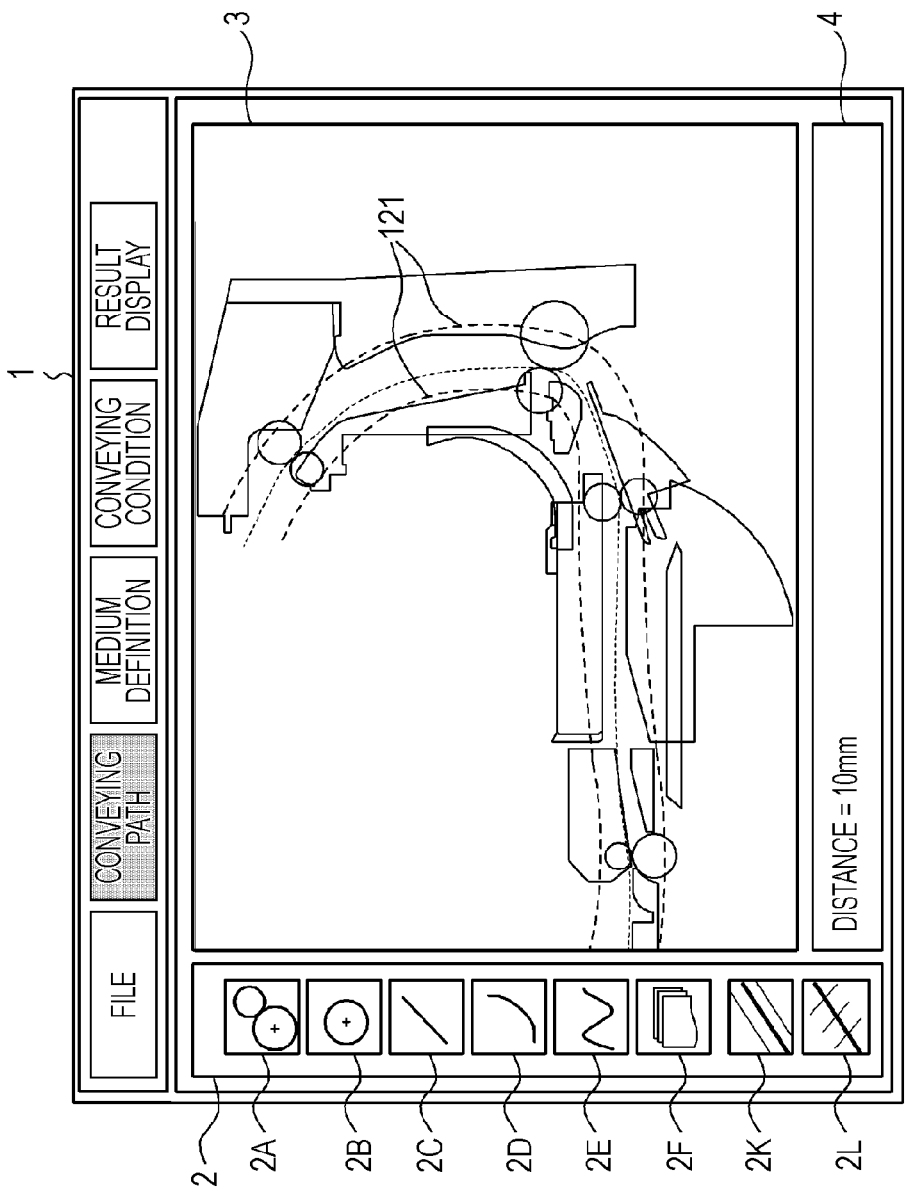
FIG. 12 illustrates a process of recognizing parts using an extraction region according to an exemplary embodiment of the present invention.

Once the locus of the recording medium is defined, a conveying guide that is likely to be in contact with the recording medium is extracted. When the locus is defined, a button 2K and a button 2L shown in FIG. 12 are displayed. When the button 2K is pressed, a pair of parallel lines 121 with the locus of the recording medium disposed therebetween as the center is displayed. At this time, the user inputs a desired numerical value in the command input field 4 to adjust the distance between the locus and the parallel lines 121. In the example of FIG. 12, the distance is set to be 10 mm. The region between the parallel lines is set as an extraction region, so that information on parts positioned inside the extraction region is extracted.

Figure 13:
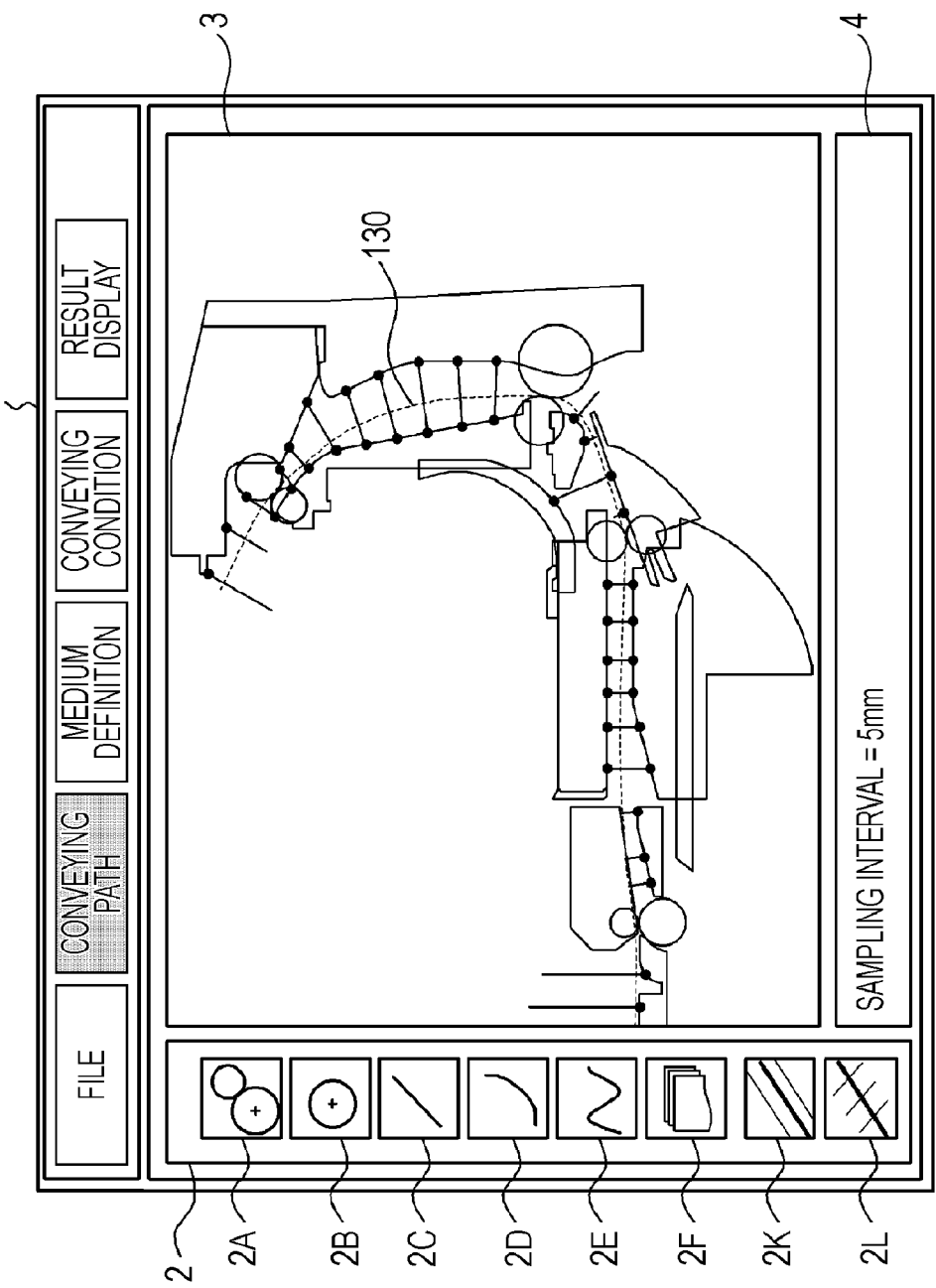
FIG. 13 illustrates a process of recognizing parts using a normal vector according to an exemplary embodiment of the present invention.

To extract a vicinity of the locus of the recording medium, the following technique can also be employed. As illustrated in FIG. 13, when the button 2L is pressed, the medium locus is divided and sampling points are defined. At this time, the user adjusts the sampling interval by inputting a desired value in the command input field 4.

In the example of FIG. 13, the sampling interval is set to be 5 mm. The computer defines a normal vector 130 for the sampling points to extract information on the part that first intersects the normal vector. When the conveying path has a convex section and thus does not have a constant width, it may not be possible to extract necessary parts within the extraction region defined by the parallel lines. In addition, when the extraction region is too large, it is likely that many unnecessary parts are extracted.

Also in the method using a normal vector, it is likely that a part located far from the recording medium is extracted when the conveying path has a discontinuous portion. Accordingly, using both the above two types of method, parts that satisfy the conditions of the method can be extracted, which prevents wasting of processing load.

Figure 14:
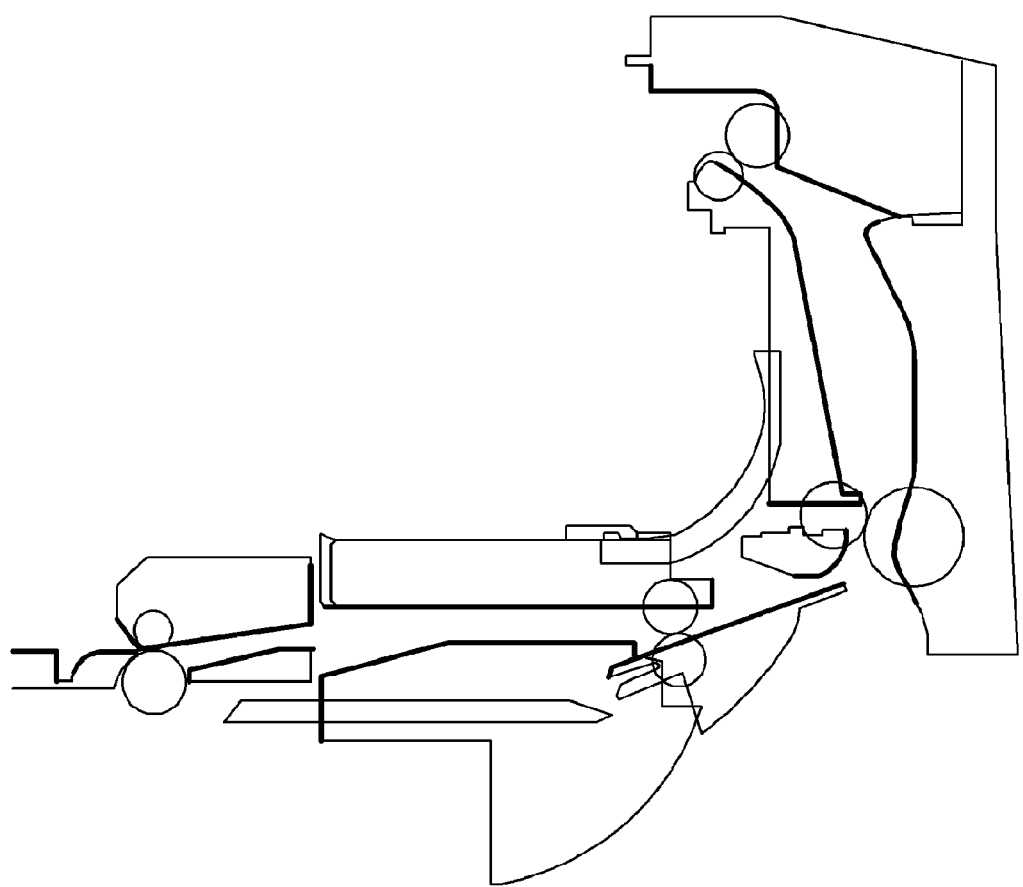
FIG. 14 illustrates highlighted parts that have been extracted in accordance with an exemplary embodiment of the present invention.

As illustrated in FIG. 14, members that have been extracted through the above methods are highlighted and distinguished from unnecessary parts. The user checks the highlighted parts and determines whether there is an excess or shortage in the number of the parts. When there is an excess or shortage, the adjustment of the extraction parameter illustrated in FIG. 12 or FIG. 13 is repeated until desired parts are recognized.

For the parts that are not highlighted, a new model file including the parts which have been excluded from the loop of the distance determination of Step 61 in FIG. 6 is created, and the new model file is output.

Figure 15:
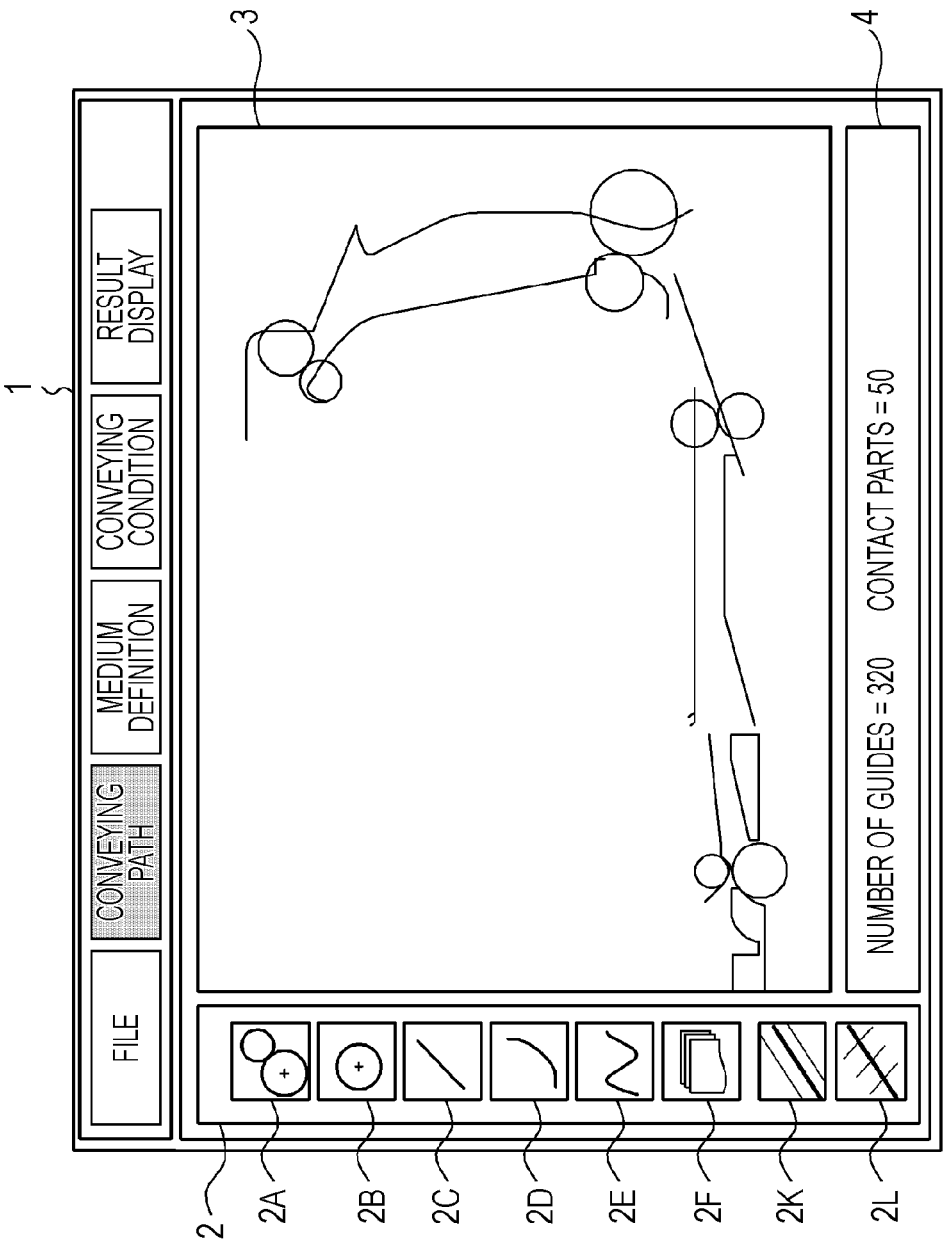
FIG. 15 illustrates a process of creating a conveying path model according to an exemplary embodiment of the present invention.

FIG. 15 illustrates a calculation file in which unnecessary parts are not displayed. The command field 4 indicates that 50 parts among 320 parts are extracted as contact parts. By creating such a calculation model, the calculation load can be significantly reduced.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-171044 filed Jun. 28, 2007, which is hereby incorporated by reference herein in its entirety.

What is claimed is:

1. A design support method for supporting design of a conveying path by simulating a behavior of a sheet-like recording medium being conveyed in the conveying path, the design support method comprising:
    reading a two-dimensional cross-sectional model created by a computer-aided design system;
    saving information on a locus of travel of the recording medium;
    recognizing parts in a vicinity of the locus of the recording medium; and
    creating a simulation model in which parts other than the parts recognized in the recognizing are excluded from objects subject to contact calculation,
    wherein the saving includes searching for a pair of conveying rollers in the conveying path in a principal cross-section created by the computer-aided design system, acquiring coordinate information on a contact point between the conveying rollers, and causing a user to define coordinates, so that a curve connecting the coordinates of the contact points and the coordinates defined by the user is defined as the locus of the recording medium.

2. The design support method of claim 1,
    wherein the recognizing includes setting, as an extraction region, a region located between parallel lines with the locus of the recording medium disposed therebetween as the center, the parallel lines each being distant from the locus by a predetermined distance, and extracting information on parts located within the extraction region.

3. The design support method of claim 2,
    wherein the parts extracted in the recognizing are distinguished from other parts and are indicated by highlighting.

4. The design support method of claim 1,
    wherein the recognizing includes sampling the locus of the recording medium defined by the user, calculating a normal vector with respect to sampling points, and extracting information on a part first intersecting the normal vector.

5. The design support method of claim 4,
    wherein the parts extracted in the recognizing are distinguished from other parts and are indicated by highlighting.

6. The design support method of claim 4,
    wherein the recognizing includes setting, as an extraction region, a region located between parallel lines with the locus of the recording medium disposed therebetween as the center, the parallel lines each being distant from the locus by a predetermined distance, and extracting information on a part which is located within the extraction region and first intersects the normal vector.

7. The design support method of claim 6,
    wherein the parts extracted in the recognizing are distinguished from other parts and are indicated by highlighting.

8. A computer-readable storage medium storing a design support program for supporting design of a conveying path by simulating a behavior of a sheet-like recording medium being conveyed in the conveying path, the design support program comprising:
    reading a two-dimensional cross-sectional model created by a computer-aided design system;
    saving information on a locus of travel of the recording medium;
    recognizing parts in a vicinity of the locus of the recording medium; and
    creating a simulation model in which parts other than the parts recognized in the recognizing are excluded from objects subject to contact calculation,
    wherein the saving includes searching for a pair of conveying rollers in the conveying path in a principal cross-section created by the computer-aided design system, acquiring coordinate information on a contact point between the conveying rollers, and causing a user to define coordinates, so that a curve connecting the coordinates of the contact points and the coordinates defined by the user is defined as the locus of the recording medium.

* * * * *